(12) United States Patent
Fuchs

(10) Patent No.: US 6,874,479 B2
(45) Date of Patent: Apr. 5, 2005

(54) INTERNAL COMBUSTION ENGINE

(75) Inventor: Wilhelm Fuchs, Rohrbach (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 10/726,643

(22) Filed: Dec. 4, 2003

(65) Prior Publication Data

US 2004/0182350 A1 Sep. 23, 2004

(30) Foreign Application Priority Data

Mar. 21, 2003 (AT) .................................. GM202/2003

(51) Int. Cl.[7] .......................... F02M 61/14; F02F 1/00
(52) U.S. Cl. ................. 123/470; 123/193.3; 123/668
(58) Field of Search ............................. 123/668, 188.8, 123/193.3, 470, 659, 669

(56) References Cited

U.S. PATENT DOCUMENTS 4,774,912 A   10/1988   Nakano et al.
4,844,030 A   7/1989    McAvoy
4,962,733 A   10/1990   Cheung

FOREIGN PATENT DOCUMENTS

| AT | 5142 | 3/2002 |
|---|---|---|
| CH | 389990 | 7/1965 |
| DE | 3039718 | 4/1981 |
| DE | 3307115 | 9/1984 |
| DE | 3420571 | 1/1986 |
| DE | 3523131 | 10/1986 |
| EP | 595676 | 5/1994 |
| GB | 111095 | 8/1917 |
| GB | 2124702 | 2/1984 |

Primary Examiner—Andrew M. Dolinar
Assistant Examiner—Katrina B. Harris
(74) Attorney, Agent, or Firm—Dykema Gossett PLLC

(57) ABSTRACT

Internal combustion engine with a flat plate that is disposed, adjacent a combustion chamber, between a cylinder head and a cylinder, said plate having at least two ports for at least one intake valve and/or one exhaust valve and/or at least one injector device or the like, and being disposed adjacent a flat cylinder head bottom. At least one relief slot is formed in the plate at least between two ports.

7 Claims, 1 Drawing Sheet

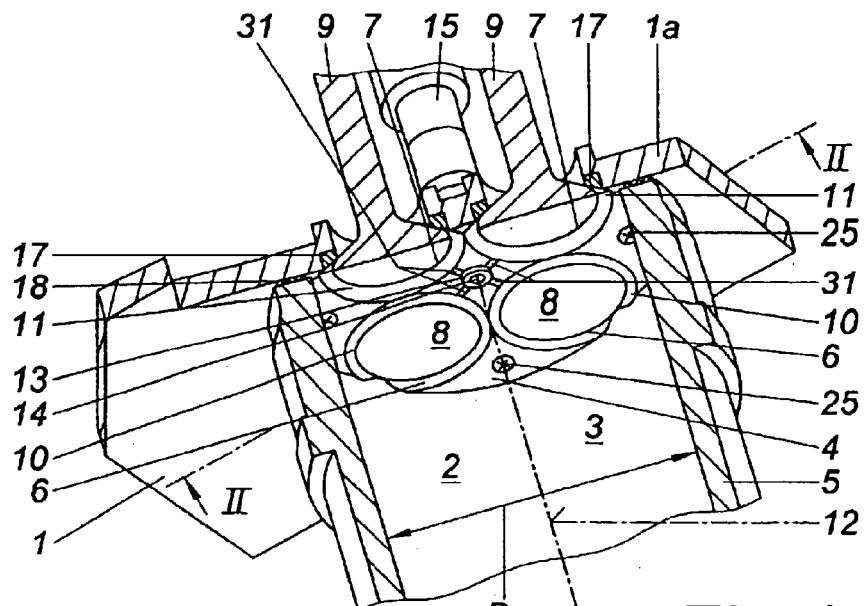
Fig.1
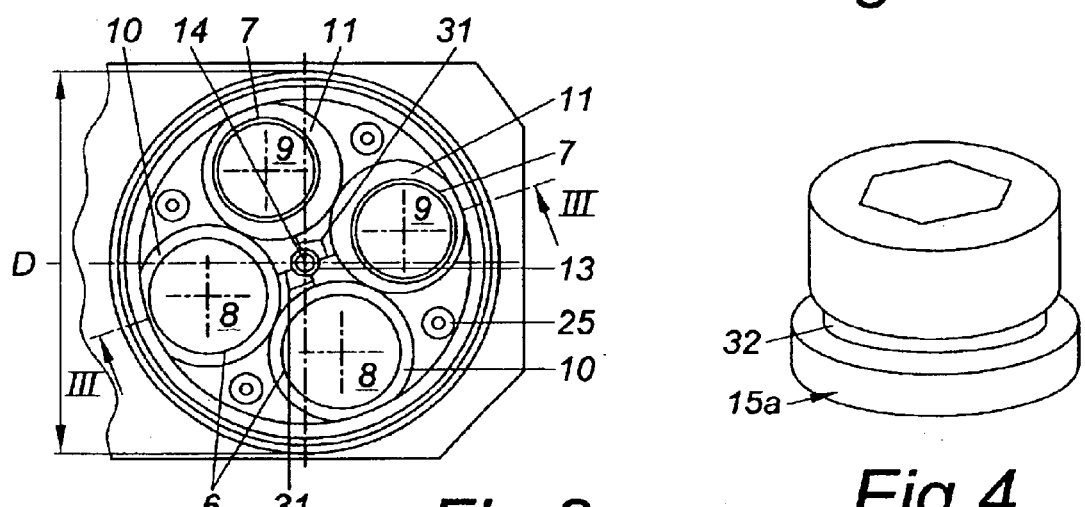
Fig.2
Fig.4
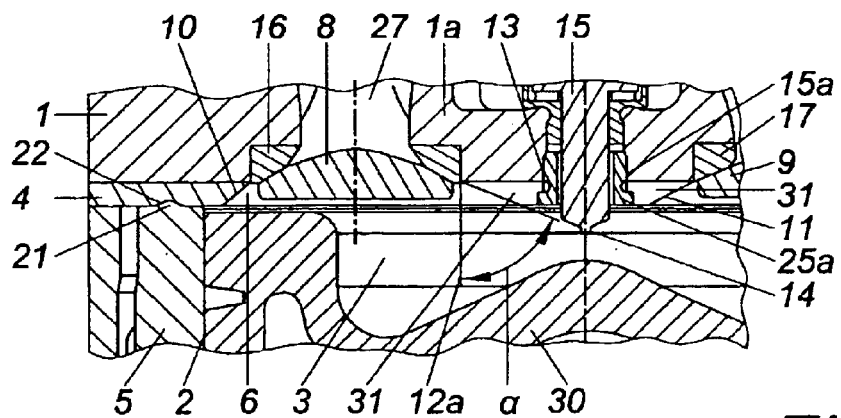
Fig.3

INTERNAL COMBUSTION ENGINE

BACKGROUND OF THE INVENTION

The invention relates to an internal combustion engine with a flat plate that is disposed, adjacent a combustion chamber, between a cylinder head and a cylinder, said plate having at least two ports for at least one intake valve and/or one exhaust valve and/or at least one injector device or the like, and being disposed adjacent a flat cylinder head bottom.

DESCRIPTION OF PRIOR ART

An internal combustion engine of the type mentioned herein above is known from AT 5.142 U1 in which the diameter of the port for the intake valves and exhaust valves is greater than the valve seat of the intake or exhaust valves, the valve seat for intake and exhaust valves being formed by the cylinder head or by a valve seat ring which is firmly connected thereto. The material chosen for the plate usually is a material that is resistant to temperature, acids and corrosion. Such type materials however have a relatively high thermal expansion coefficient. Due to the high thermal expansion coefficient of the plate and to the differing temperatures of plate, cylinder head and cylinder liner, high tensions and plastic deformation occur as a result of the heat input in the region of the valve bridges, which drastically increases the risk of fracture.

A cylinder head for an internal combustion engine is known from U.S. Pat. No. 4,774,912, said cylinder head consisting of a top part that has a rigid structure, is provided with cooling water chambers and is closed by a bottom plate which is disposed adjacent the water chambers. The two parts of the cylinder head are joined to form a single common structure. The bottom plate is formed from a metal of higher high-temperature strength and lower thermal conductivity than those of which the top part with the rigid structure is made. Higher cylinder pressures may thus be realized. The water chambers, which are disposed directly adjacent the bottom plate, require however the top part to have a construction of its own and sealing provisions for the cooling agent to be provided, which increases the manufacturing expense.

A cylinder head of an internal combustion engine is known from DE 33 07 115 A1, the surface facing the combustion chamber being covered by a plate which is comprised of ports for the valves, the spark plugs or the injection nozzles. The plate is intended to insulate the cylinder head against the combustion chamber. The circular plate is thereby shrink fit into a collar formed in the cylinder head. This presents the disadvantage that the cylinder head bottom needs to be machined separately and that additional working steps are required for the shrink fitting procedure, which again substantially increases the manufacturing expense. Further, the cylinder head bottom is fatigued by the notch effect. Similar plates are known from the publications CHF 389 990 A, DE 35 23 131 C1 and DE 30 39 718 A1.

AB 111 095 A1 discloses an internal combustion engine with a bottom plate that is disposed adjacent a flat cylinder head bottom. The valve seat is provided in the bottom plate.

A cylinder head of aluminum for an air-cooled internal combustion engine is known from AB 2 124 702 A, gaps being provided for reducing the thermal tensions. The perimeter gaps extend from the bottom of the combustion chamber substantially in the direction of the cylinder's axis.

U.S. Pat. No. 4,844,030 shows a cylinder head with relief notches that are circumferential disposed about an injection nozzle bore or between intake valve ports in order to minimize the thermal stresses.

U.S. Pat. No. 4,962,733 discloses a cylinder head that has, in the bottom of the combustion chamber, a notch-like cavity provided between the intake valve ports. This provision is also intended to reduce thermal stresses. In none of the documents AB 2 124 702 A, U.S. Pat. No. 4,844,030 or U.S. Pat. No. 4,962,733 there is provided a plate for the combustion chamber.

SUMMARY OF THE INVENTION

It is the object of the invention to reduce, in an internal combustion engine of the type mentioned herein above, the stresses within the plate, which are the result of heat input thereto.

This is achieved, in accordance with the invention, in that at least one relief slot is formed in the plate at least between two ports. There is thereby preferably provided that the relief slot be disposed radially relative to the two ports.

The stresses in the region of the valve bridges may be substantially reduced by more specifically disposing the relief slot between a port of a preferably centrally disposed injector device and the port of an intake or exhaust valve.

Analyses have shown that a relief is clearly achieved with as little as one relief slot at least being provided respectively between at least two ports for intake and/or exhaust valves, which are opposed diametrically about the port of the injector device, and the port for the injector device. It is however particularly advantageous to have at least one relief slot formed in the plate between a respective one of the ports of the intake and/or exhaust valves and the port of the injector device.

The relief slots formed in the plate make the structure of the plate more flexible, this flexibility in turn allowing the material to expand in the region of the ridges. The important point thereby is that the expansion of the plate is not hindered by other structural members.

If the injector device is secured to the cylinder head through a female swivel nut, it is particularly important that the plate be at least partially released relative to the male swivel nut. The male swivel nut is thus largely prevented from hindering the plate. The release between plate and male swivel nut may advantageously be achieved if the male swivel nut is comprised of an annular release groove for the plate. The function of the valve seat is traditionally performed by the cylinder head. The plate may thus be configured to be very simple and flat and lies flush against a flat flange surface of the cylinder head bottom. It is not necessary to provide the cylinder head bottom with collar-like cavities for inserting the plate. Except for the ports for the intake valves, exhaust valves, injector devices, for overflow water and/or screws, the cylinder head bottom is a continuous, level structure. As a result, a standard cylinder head can be used without having to change the construction thereof or to provide for additional machining steps. Already existing standard cylinder heads may also easily be retrofitted with the bottom plate. Further, and in spite of the protruding valves, a piston may be used that has no pocket, meaning a piston with an also flat crown. This is to be preferred at high ignition pressures and high thermal loads for reasons of stability The plate can be made of a highly flame resistant alloy or of a ceramic material. Heat input to the cylinder head bottom may thus be efficiently minimized. Alternatively, the plate may also be formed from austenitic or maternities stainless steel or of cast steel.

BRIEF DESCRIPTION OF THE DRAWINGS

The invention will be understood better upon reading the following description with reference to the FIGS. In which FIG. 1 is a sectional view through a cylinder of an internal combustion engine of the invention viewed from an oblique angle, FIG. 2 shows the cylinder head according to line II—II in FIG. 1 viewed from the combustion chamber side, FIG. 3 is a sectional view of the internal combustion engine in a second embodiment of the invention viewed along line III—III of FIG. 2 and FIG. 4 shows a male swivel nut of the injector device in an oblique view.

DETAILED DESCRIPTION OF THE PREFERRED EMBODIMENTS

In the implementation variants, like elements will bear the same reference numerals.

A plate 4 adjacent the combustion chamber 3 is disposed between a cylinder head 1 and a cylinder 2. The flat plate 4 snugly fits on a flat cylinder head bottom 1a that is closed throughout except for the ports for the intake valves 8 and/or exhaust valves 9 and/or the injector devices 15. In the exemplary embodiments, the cylinder 2 is formed from a cylinder liner 5 that is disposed in a cylinder housing that has not been illustrated in further detail herein. The flat plate 4, which is made of a metallic material, is comprised of ports 6, 7 for intake valves 8 and exhaust valves 9 respectively. In order to form a favorable flow geometry for the cylinder air charge change, chafers 10, 11 are formed in the plate 4 around a respective one of the ports 6, 7, said chafers having each, in the circumferential direction, a continuously varying angle a relative to a line 12a that is parallel to the cylinder's axis. In the region of the cylinder's axis 12, the plate 4 further has a port 13 for the discharge outlet 14 into the combustion chamber 3 of an injector device 15. The valve seats of the intake valves 8 and of the exhaust valves 9 respectively, which are formed by the valve seat rings 16, 17, are disposed in the cylinder head 1.

In the exemplary embodiment shown in the FIGS. 1 and 2, the plate 4 is circular and has a diameter D that maximally corresponds to the bore diameter B of cylinder 2. The plate 4 is secured to the flat cylinder head bottom 1a by means of screws 25. A cylinder head seal 18 is disposed between cylinder head 1 and cylinder liner 5, said seal performing the sealing function against the combustion chamber 3 between cylinder head 1 and cylinder liner 5. In the direction of the cylinder's axis 12, the plate 4 has a thickness that is greater or smaller than the thickness of the cylinder head seal 18.

FIG. 3 shows a second implementation variant in which the plate 4, which is disposed between the cylinder head bottom 1a of the cylinder head 1 and the cylinder liner or liners 5, projects beyond the bore diameter B of cylinder 2 and advantageously extends the entire cylinder head bottom 1a. In this embodiment, a separate cylinder head seal may be dispensed with if the plate 4 performs the sealing function against the cylinder liner 5. To ensure tightness between cylinder liner 5 and the plate 4 relative to the combustion chamber 3, it is advantageous to form a perimeter ridge 21 and/or a groove 22 in the region of the sealing surface of the cylinder liner 5 or the plate 4 in order to further improve the sealing function. To seal it against cooling agents and lubricants, the plate 4 may be coated or equipped with elastic sealing elements.

In the second implementation variant, the plate 4 is not only provided with the ports 6 and 7 for the intake valves 8 and the exhaust valves 9 and with the port 13 for the discharge outlet 14 of the injector device 15, but also comprises, between cylinder housing and cylinder head 1, bores (not shown) for the cylinder head screws and/or at least one port for the push rod, for overflow water and/or for overflowing oil. Gas exchange conduits are indicated at 27.

In the implementation variant shown in FIG. 3, the plate 4 may be secured about the injector device 15 in the injector receiving bore 15a through a male swivel nut 25a, in addition to or instead of the screws 25. A piston that reciprocates in cylinder 2 is labeled at 30.

In order to minimize thermal stresses in the plate 4, radial relief slots 31 have been cut out therefrom between the ports 6, 7 for the intake valves 8 and the exhaust valves 9 on the one side and the port 13 for the injector device 15 on the other side. To compensate for the stress induced relative movements of the plate 4, the latter is released relative to the male swivel nut 15a. For this purpose, the male swivel nut 15a is comprised of a circumferential groove 32.

The plate 4, which is advantageously made of a heat resistant alloy, reduces the heat input to the cylinder head bottom 1a and reduces the thermal stresses in the cylinder head 1. This provides an enhanced liberty in the choice of material for the cylinder head 1. Further, the chafers in the head bottom do not weaken the structure of the cylinder head 1.

What is claimed is:

1. An internal combustion engine with a flat plate that is disposed, adjacent a combustion chamber, between a cylinder head and a cylinder, said plate having at least two ports for at least two components selected from the group intake valve, exhaust valve and injector device, and being disposed adjacent a flat cylinder head bottom, wherein at least one relief slot is formed in the plate at least between two ports.

2. The internal combustion engine according to claim 1, wherein the relief slot is disposed radially relative to the two ports.

3. The internal combustion engine according to claim 1, wherein the relief slot is disposed between a port of an injector device and the port for a component selected from the group intake valve and exhaust valve.

4. The internal combustion engine according to claim 3, wherein one relief slot at least is provided respectively between at least two ports for intake and/or exhaust valves, which are opposed diametrically about the port of the injector device, and the port for the injector device.

5. The internal combustion engine according to claim 3, wherein at least one relief slot is formed in the plate between a respective one of the ports of the intake valves and/or exhaust valves and the port of the injector device.

6. The internal combustion engine according to claim 1, said internal combustion engine having a male swivel nut for securing the injector device to the cylinder head that is disposed in the port of the injector device, wherein the plate is at least partially released relative to the male swivel nut.

7. The internal combustion engine according to claim 6, wherein the male swivel nut has an annular release groove for the plate.

* * * * *